Figures 1, 2:
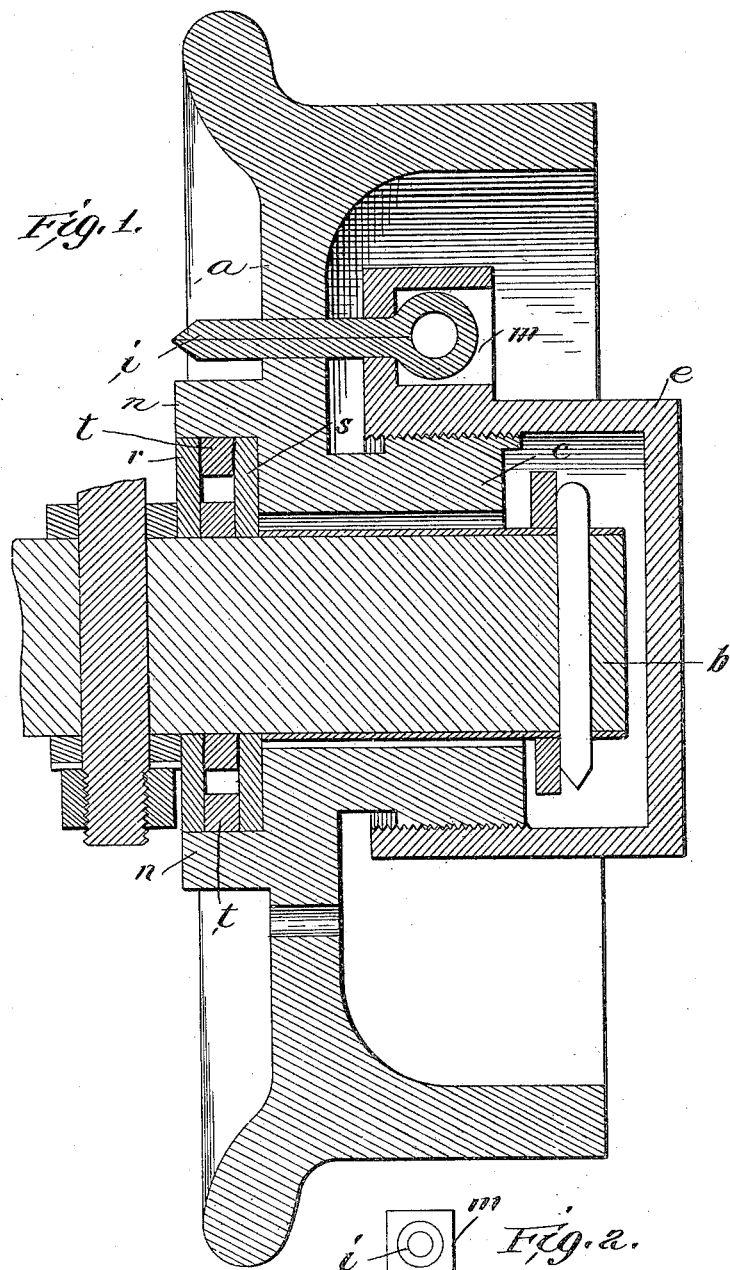

No. 690,916. Patented Jan. 14, 1902.
I. BESLY.
WHEEL BEARING.
(Application filed Mar. 12, 1900.)
(No Model.)

Attest:
William F. Hall
L. B. Middleton

Inventor:
Irving Besly
Ellis Spear
by
Atty.

UNITED STATES PATENT OFFICE.

IRVING BESLY, OF DENVER, COLORADO.

WHEEL-BEARING.

SPECIFICATION forming part of Letters Patent No. 690,916, dated January 14, 1902.

Application filed March 12, 1900. Serial No. 8,383. (No model.)

*To all whom it may concern:*

Be it known that I, IRVING BESLY, a citizen of the United States, residing at Denver, in the county of Arapahoe and State of Colorado, have invented new and useful Improvements in Wheel-Bearings, of which the following is a specification.

My invention relates to wheels and bearings therefor; and the object thereof is to provide means for effectively lubricating the bearings of a wheel and rendering the same dust-proof.

The invention is illustrated in the accompanying drawings, in which—

Figure 1 is a vertical cross-sectional view of a wheel and bearing embodying my invention, and Fig. 2 a detail end view.

The structure shown in the accompanying drawings and described hereinafter is particularly adapted to feed a plastic lubricant to the bearing parts of a wheel and axle upon which the latter is journaled and to effectively prevent dust or dirt entering between said bearing parts.

The wheel (indicated by the letter $a$) is a representative of a well-known type of car-wheels, and is provided with a hub $c$, having the end portion thereof threaded exteriorly to receive a cap $e$, which covers the end of the hub and completely incloses the end of an axle $b$, upon which the wheel $a$ is journaled. The cap prevents any dust or dirt entering around the end of the axle. The cap $e$ is of a greater depth than the length of the hub, and it is designed to provide a reservoir for a plastic lubricant, which is forced between the bearing parts of the wheel and axle by screwing up the cap. The cap is retained in adjusted position by means of a pin $i$, extending through an extension or boss $m$ on the cap, engaging either of two holes in the web of wheel $a$, located diametrically opposite to each other.

To prevent dust entering between the bearing-surfaces from the side of the wheel opposite to that on which cap $e$ is located, a circuitous passage is provided leading to the space between said bearing portions. For this purpose an annular flange $n$ is provided on the inner face of the wheel $a$, forming a pocket which receives two washers $r\ s$, carried by axle $b$, these washers bearing on opposite sides of a ring $t$, extending inwardly from the flange and rotating therewith.

In operation a plastic lubricating medium is placed in the chamber in cap $e$ and the latter screwed up to force the medium between the bearing-surfaces. The pin $i$ is then inserted to retain the cap in adjusted position. To feed a fresh supply of the lubricant between the bearing parts, the pin $i$ is withdrawn and the cap given a half-turn, which will contract the chamber therein, and consequently force a quantity of the material held in said chamber between the bearing-surfaces. It will be noted that the outer side of the wheel is absolutely dust-proof and that the inner side is substantially so by reason of the arrangement of the washers, and, further, by reason of the fact that the lubricant is forced out through the passage between the washers and necessarily carries off any dust or dirt which may have started to work in between said washers.

I claim—

1. In combination, an axle, a wheel having a hub projecting from one face thereof with a threaded end portion, and a cap having a chamber therein of greater depth than the length of the hub adapted to hold a plastic lubricant, said cap covering the end of the hub and completely inclosing the end of said axle, said cap being designed to be adjusted on the hub to reduce the area of the chamber therein and a device for retaining the cap in adjusted position, substantially as described.

2. In combination, a wheel having a hub projecting from one face and screw-threaded, a cap adjustable on said hub to force the lubricant contained therein to the parts to be lubricated and a series of washers on the side of the wheel opposite the hub, said series comprising an intermediate washer and a side washer on each side of the same, a close joint being formed between one of the said side washers and the wheel and a second close joint being formed between the intermediate washer and the other side washer, substantially as described.

3. In combination with a wheel having a screw-threaded hub, a reservoir screw-threaded thereon and means for holding the reservoir in different positions to which it may be turned about the hub, said means being independent of the screw-threads substantially as described.

4. In combination, a wheel having a screw-threaded laterally-projecting hub, a reservoir screw-threaded thereon, to be adjusted longitudinally of the said hub and means for holding the reservoir in different positions, substantially as described.

In testimony whereof I have signed my name to this specification in the presence of the subscribing witnesses.

IRVING BESLY.

Witnesses:
E. BESLY,
GEORGE BROWN,
ELBERT BESLY.